United States Patent
Kitabayashi et al.

(10) Patent No.: US 7,027,692 B2
(45) Date of Patent: Apr. 11, 2006

(54) OPTICAL FIBER COUPLING STRUCTURE AND METHOD FOR COUPLING OPTICAL FIBERS

(75) Inventors: Tomoharu Kitabayashi, Sakura (JP); Tetsuya Sakai, Sakura (JP)

(73) Assignee: Fujikura Ltd., Tokyo (JP)

( * ) Notice: Subject to any disclaimer, the term of this patent is extended or adjusted under 35 U.S.C. 154(b) by 0 days.

(21) Appl. No.: 11/048,922

(22) Filed: Feb. 3, 2005

(65) Prior Publication Data

US 2005/0175289 A1 Aug. 11, 2005

(30) Foreign Application Priority Data

Feb. 5, 2004 (JP) .............................. 2004-029406

(51) Int. Cl.
*G02B 6/26* (2006.01)
(52) U.S. Cl. ............................................ 385/50; 372/6
(58) Field of Classification Search ................. 385/31, 385/39, 50, 52, 53, 74, 88, 147; 359/341.32; 372/6, 70, 72
See application file for complete search history.

(56) References Cited

U.S. PATENT DOCUMENTS 6,196,732 B1 * 3/2001 Tamekuni et al. ............. 385/78
6,529,318 B1 * 3/2003 Kaneda et al. .......... 359/341.32
2003/0077034 A1 4/2003 Chiba et al.

FOREIGN PATENT DOCUMENTS

| EP | 0628842 A | 12/1994 |
| EP | 0712015 A | 5/1996 |
| JP | 59038707 A | 3/1984 |
| JP | 63179304 | * 7/1988 |
| JP | 63179304 A | 7/1988 |
| JP | H01-297874 A | 11/1989 |
| JP | 2005-3871 A | 1/2005 |

* cited by examiner

*Primary Examiner*—Akm Enayet Ullah
(74) *Attorney, Agent, or Firm*—Sughrue Mion, PLLC (57) ABSTRACT

An optical fiber coupling structure for optically coupling an emission-side optical fiber and an incidence-side optical fiber includes: an emission-side base; and an incidence-side base, wherein the emission-side optical fiber is secured to the emission-side base, and an end of the emission-side optical fiber is exposed at the coupling end surface, wherein the incidence-side optical fiber is secured to the incidence-side base, and an end of the incidence-side optical fiber is exposed at a slope provided in said incidence side base, and wherein the coupling end surface of the emission-side base is abutted against the abutting surface of the incidence-side base, the emission-side optical fiber exposed at the coupling end surface of the emission-side base and the incidence-side optical fiber exposed at the slope of the incidence-side base are spaced apart with a clearance, and the emission-side optical fiber and the incidence-side optical fiber are optically coupled.

17 Claims, 7 Drawing Sheets

OPTICAL FIBER COUPLING STRUCTURE AND METHOD FOR COUPLING OPTICAL FIBERS

BACKGROUND OF THE INVENTION

1. Field of the Invention

The present invention relates to an optical fiber coupling structure and to a method for coupling optical fibers used for optical fiber lasers or the like.

Priority is claimed on Japanese Patent Application No. 2004-29406, filed Feb. 5, 2004, the contents of which are incorporated herein by reference.

2. Description of Related Art

In recent years, optical fiber lasers and optical fiber amplifiers have been studied actively. In these devices, an optical fiber using as host glass silica glass doped with rare earth elements, such as erbium (Er), neodymium (Nd), ytterbium (Yb), or holmium (Ho) (hereinafter referred to as "rare earth element doped optical fiber") or fluoride glass is used as a laser medium.

An optical fiber laser has an advantage in that a single medium can be used for both emission and propagation of a laser, in addition to having high efficiency and enabling size reduction. Because of these advantages, optical fiber lasers have been used in a wide variety of fields, including optical communications, optical sensing technologies, machining of materials, and medical technologies.

Figure 6:
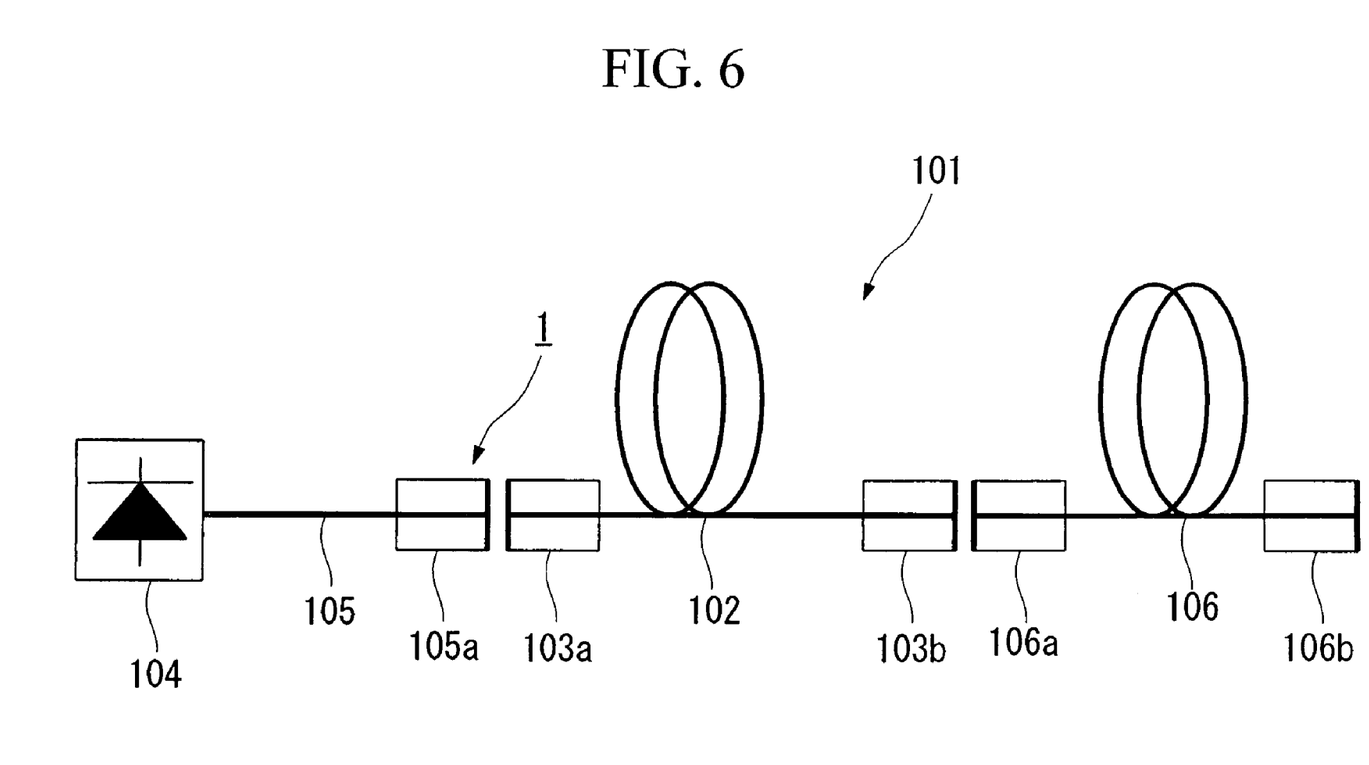
FIG. 6 is a schematic diagram of an optical fiber laser.

FIG. 6 is a schematic diagram of a typical fiber laser. As shown in FIG. 6, a fiber laser 101 includes a rare-earth doped optical fiber 102 and resonator mirror 103a and 103b that are disposed at the two ends of the rare-earth doped optical fiber 102. The length of the rare-earth doped optical fiber 102 is adjusted so that a desired output characteristic is obtained. Having such a structure, the fiber laser 101 functions as an optical resonator.

For example, dielectric multilayer films are used as the resonator mirror 103a and 103b, which reflect output laser light and transmit excitation light. Excitation light is emitted from an excitation light source 104 via the resonator mirrors 103a and 103b. The excitation light source 104 is coupled to a guide fiber 105 that propagates that excitation light, and the light emitted from the guide fiber 105 is incident on the rare-earth doped optical fiber 102.

For industrial applications of optical lasers, it is desired that a laser be guided through an optical fiber and be incident on a desired location. For this reason, a transmission optical fiber 106 is coupled to the output of the rare-earth doped optical fiber 102.

It is known that the laser operation sometimes becomes unstable in a conventional optical fiber laser, such as the optical fiber laser 101, since light is reflected on an end surface of the optical fiber, and some of the output laser light is returned to the resonator or some of the excitation light is incident on the excitation light source 104. In order to reduce the reflection of light, nonreflective dielectric multilayer films are provided on an end surface 105a of the guide fiber and end surfaces 106a and 106b of the transmission fiber.

The end surfaces of such optical fibers are formed as optical connectors so that the optical fibers are coupled with a high precision, and upon coupling optical fibers using the optical connectors, the end surfaces of the optical fibers physically contact each other, which may damage the dielectric multilayer films (see Japanese Unexamined Patent Application, First Publication No. H01-297874, for example).

Figure 7A:
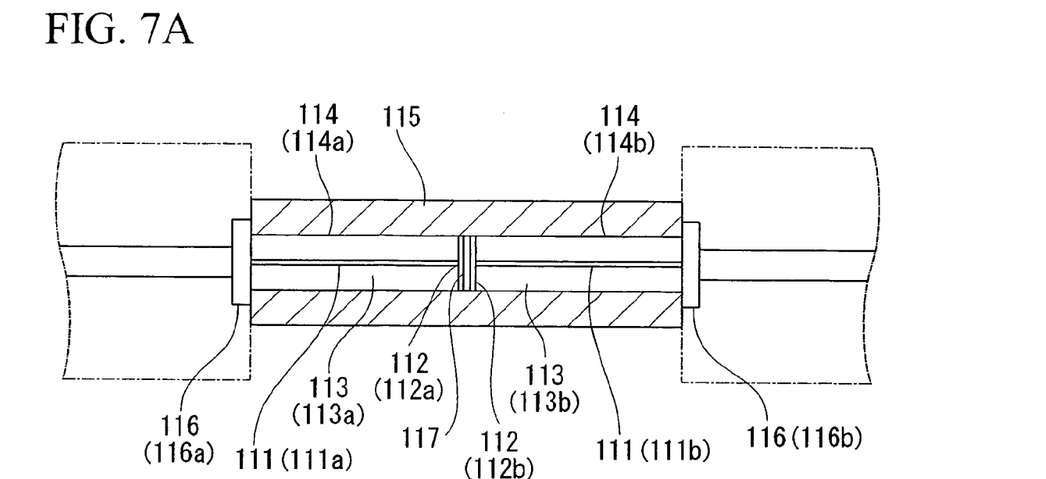
FIG. 7A is a enlarged cross-sectional view of one example of a conventional optical fiber coupling structure in which optical fibers are aligned in the axial direction at the ends of a sleeve.

In view of the above-mentioned problem, the present inventors have proposed some connector structures that can prevent damage to dielectric multilayer films due to coupling or the like. The connector structures are shown in FIGS. 7A and 7B. In the structure shown in FIG. 7A, at ends of the optical fibers 111 (reference numeral 111a denotes an incidence-side optical fiber, and reference numeral 111b denotes an emission-side optical fiber), dielectric multilayer films 112a and 112b are provided, respectively. At one end of the optical fibers 111, ferrules 113a and 113b or the like are provided to construct connectors 114. In order to couple the optical fibers 111, the ferrules 113a and 113b of the connectors 114a and 114b are advanced into a sleeve 115. Upon coupling, when flanges 116a and 116b protruding from the rear end (the end opposing to the end surface) of the ferrules 113a and 113b contact the sleeve 115, the ferrules 113a and 113b prevent from being inserted further. As a result, a small clearance 117 is defined between the dielectric multilayer films 112a and 112b; thus the damage to the dielectric multilayer films 112a and 112b can be prevented.

Figure 7B:
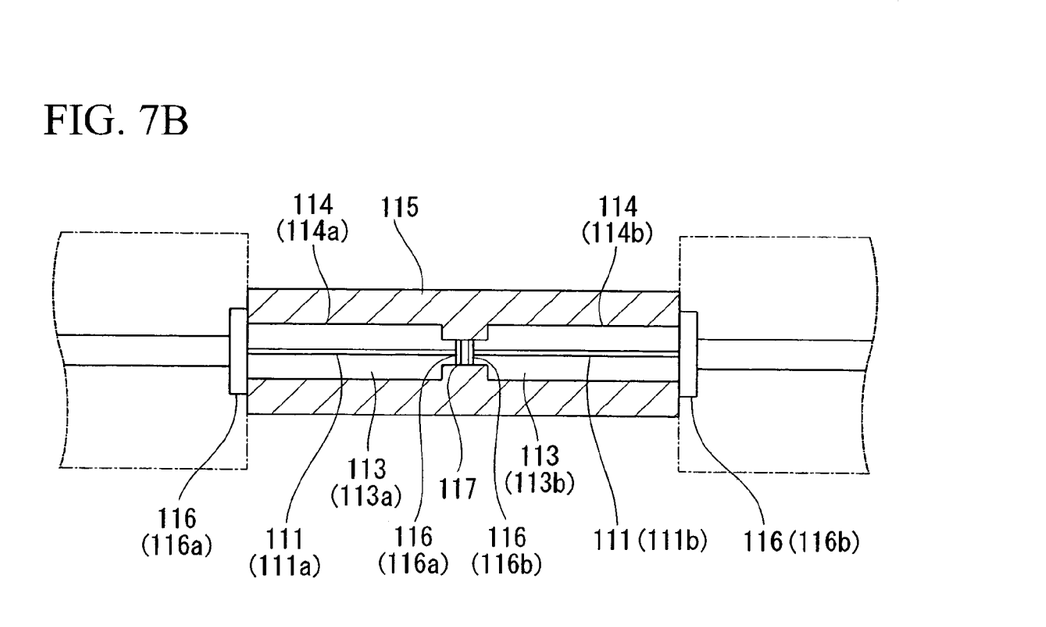
FIG. 7B is a enlarged cross-sectional view of another example of a conventional optical fiber coupling structure in which optical fibers are aligned in the axial direction within a sleeve.

The structure shown in FIG. 7B is similar to the structure in FIG. 7A in that flanges 116a and 116b of the ferrules 113a and 113b restrict the insertion beyond the limit in order to prevent the damage to the dielectric multilayer films 112. In addition to that, the ends of the ferrules 113a and 113b are abutted against the protrusion provided inside the sleeve 115, thereby preventing the connectors 114a and 114b from being inserted further into the sleeve 115 (see, for example, Japanese Unexamined Patent Application, First Publication No. 2005-3871 by the applicants of the present invention).

In the coupling structures for optical fibers described above, upon coupling the optical fibers 111a and 111b, the spacing between the end surfaces is defined by mechanical engagement among the ferrules 113a and 113b and the sleeve 115. In order to realize an optical coupling with low loss, the internal structures of the ferrules 113a and 113b and the sleeve 115 should be manufactured with a very high precision (for example, on the order of submicrons). More specifically, if a slight misalignment in a horizontal direction (core misalignment) is present in the optical coupling between the optical fibers 111a and 111b, some of the light emitted from the emission-side optical fiber 111a may not be incident on the core of the incidence-side optical fiber 111b. As a result, loss may be incurred and the optical characteristics of the coupling may be adversely affected. For this reason, when coupling the optical fibers 111a and 111b, the outer diameter of ferrules 113a and 113b and the inner diameter of the sleeve 115 should be aligned very precisely. Thus, these parts need to be manufactured with a very high precision, which requires intensive work. In addition, if the clearance 117 is not precisely set, the spot radius of the light emitted from the emission-side optical fiber 111a and then incident on the incidence-side optical fiber 111b may become larger than the core radius of the incidence-side optical fiber 111b. In such a case, a part of the light emitted from the emission-side optical fiber 111a is not incident on the core of the incidence-side optical fiber 111b. As a result, loss may be incurred and the optical characteristics of the coupling may be adversely affected. For this reason, the optical fibers 111a and 111b should be aligned very precisely, and the ferrules 113a and 113b and the sleeve 115 need to be manufactured with a very high precision, which requires intensive work.

Furthermore, thermal curing adhesive is required for attaching the ferrule 113a and the optical fiber 111a, and the ferrule 113b and the optical fiber 111b, which is time consuming.

SUMMARY OF THE INVENTION

The present invention was made in view of the above-described background, and an object thereof is to provide an optical fiber coupling structure that can optically couple optical fibers with a simple structure without requiring high precision alignment parts.

To achieve the above-described objects, a first aspect of the present invention is directed to an optical fiber coupling structure for optically coupling an emission-side optical fiber and an incidence-side optical fiber, including: an emission-side base including a first groove and a coupling end surface; and an incidence-side base including a second groove, an abutting surface, and a slope, in which the emission-side optical fiber is secured to the emission-side base, and an end of the emission-side optical fiber is exposed at the coupling end surface, in which the incidence-side optical fiber is secured to the incidence-side base, and an end of the incidence-side optical fiber is exposed at the slope, and wherein the coupling end surface of the emission-side base is abutted against the abutting surface of the incidence-side base, the emission-side optical fiber exposed at the coupling end surface of the emission-side base and the incidence-side optical fiber exposed at the slope of the incidence-side base are spaced apart with a clearance, and the emission-side optical fiber and the incidence-side optical fiber are optically coupled.

In the optical fiber coupling structure described above, a core radius $r_2$ of the incidence-side optical fiber may be larger than a core radius $r_1$ of the emission-side optical fiber.

In the optical fiber coupling structure described above, an end surface spacing D that is a distance between the end surface of the emission-side optical fiber and an end of a slope provided in a core of the incidence-side optical fiber may be expressed by the following formula (1):

$$D < \frac{r_2 - r_1}{\tan\{\sin^{-1}(NA_1)\}} - 2r_2 \cdot \tan\alpha \tag{1}$$

wherein $\alpha$ is an angle between the coupling end surface of the emission-side base and the slope of the incidence-side base, and $NA_1$ is a numeric aperture of the emission-side optical fiber.

In the optical fiber coupling structure described above, a coupling loss L defined in the following formula (2) may be less than 0.1:

$$L = (L_1 + L_2)/2 \tag{2}$$

where $$L_1 = \begin{cases} 0 & (\theta_{t\_max} > \theta_{t1}) \\ 1 - \theta_{t\_max}/\theta_{t1} & (\theta_{t\_max} \leq \theta_{t1}) \end{cases}$$

$$L_2 = \begin{cases} 0 & (\theta_{t\_max} > \theta_{t2}) \\ 1 - \theta_{t\_max}/\theta_{t2} & (\theta_{t\_max} \leq \theta_{t2}) \end{cases}$$

where $\theta_{t\_max}$ is a maximum propagation angle, and $$\theta_{t\_max} = \sin^{-1}(NA_2/n_c)$$

$$\theta_{t1} = \sin^{-1}\{1/n_c \times \sin[\sin^{-1}(NA_1) + \alpha]\} - \alpha$$

$$\theta_{t2} = \sin^{-1}\{1/n_c \times \sin[\sin^{-1}(NA_1) - \alpha]\} + \alpha$$

where $n_c$ is a refractive index of a core of an optical fiber, $NA_1$ is a numeric aperture of the emission-side optical fiber, and $NA_2$ is a numeric aperture of the incidence-side optical fiber.

In the optical fiber coupling structure described above, the end surface angle $\alpha$ may satisfy a condition expressed by the following formula (3):

$$\sin^{-1}(NA_1/n_c) > |\sin^{-1}\{1/n_c \times \sin(\sin^{-1}(NA_1) \pm \alpha)\} \mp \alpha| \tag{3}$$

A second aspect of the present invention is directed to a method for optically coupling an emission-side optical fiber and an incidence-side optical fiber, including the steps of: providing an emission-side base including a first groove and a coupling end surface; providing an incidence-side base including a second groove, an abutting surface, and a slope; securing the emission-side optical fiber to the first groove of the emission-side base to expose an end of the emission-side optical fiber at the coupling end surface of the emission-side optical fiber; securing the incidence-side optical fiber to the second groove of the incidence-side base to expose an end of the incidence-side optical fiber at the slope of the incidence-side optical fiber; and optically coupling the emission-side optical fiber and the incidence-side optical fiber by abutting the coupling end surface of the emission-side base against the abutting surface of the incidence-side base so that the emission-side optical fiber exposed at the coupling end surface of the emission-side base and the incidence-side optical fiber exposed at the slope of the incidence-side base are spaced apart with a clearance, and the emission-side optical fiber and the incidence-side optical fiber are optically coupled.

According to an exemplary embodiment of the present invention, the emission-side optical fiber and the incidence-side optical fiber are optically coupled by abutting the coupling end surface and the abutting surface against each other, and the slope is formed on the surface of the incidence-side base to which the incidence-side optical fiber is exposed. Therefore, the spot radius of the incidence-side optical fiber is enlarged and an optical coupling with low loss is realized even when a horizontal misalignment is present. Therefore, it is possible to reduce the cost since high precision coupling parts that have been used conventionally are no longer required.

Furthermore, by abutting the coupling end surface and the abutting surface each other, a clearance is defined between an end surface of the emission-side optical fiber and an end surface of an incidence-side optical fiber. Therefore, the emission-side optical fiber and the incidence-side optical fiber can be optically coupled without the dielectric multilayer films being in contact with each other. Thus, damage to the dielectric multilayer films that are provided on the end surface of the optical fibers can be prevented.

Moreover, since the core radius $r_2$ of the incidence-side optical fiber may be equal to or more than the core radius $r_1$ of the emission-side optical fiber, the spot radius of the incidence-side optical fiber can be enlarged. Accordingly, an optical coupling with low loss is ensured.

Furthermore, it is possible to reduce the cost by applying the optical fiber coupling structure of the present invention to non-removable-type optical connectors.

BRIEF DESCRIPTION OF THE DRAWINGS

The above and other objects, features and advantages of the invention will become more apparent by describing in detail exemplary embodiments thereof with reference to the attached drawings in which.

DETAILED DESCRIPTION OF THE INVENTION

Hereinafter, various exemplary embodiments of the prevent invention will be described with reference to the drawings. The described exemplary embodiments are intended to assist the understanding of the invention, and are not intended to limit the scope of the invention in any way. FIG. 1 to FIG. 4 illustrate an exemplary embodiment of the present invention in which the present invention is applied for coupling optical fibers in an optical fiber laser. First, the optical fiber laser will be explained.

The optical fiber laser 101 shown in FIG. 6, similar to the optical fiber laser described above, includes an excitation light source 104, a guide fiber 105, a rare-earth doped optical fiber 102, and a transmission fiber 106. The excitation light source 104 emits excitation light to the guide fiber 105 that propagates the excitation light, and then the light is incident on the rare-earth doped optical fiber 102 that emits the light to the transmission fiber 106.

As described previously, dielectric multilayer films are provided on the end surfaces of each optical fiber, which prevents a part of the reflected output laser light from returning to the resonator, and prevents some of the excitation light from being incident on the excitation light source.

Figure 1:
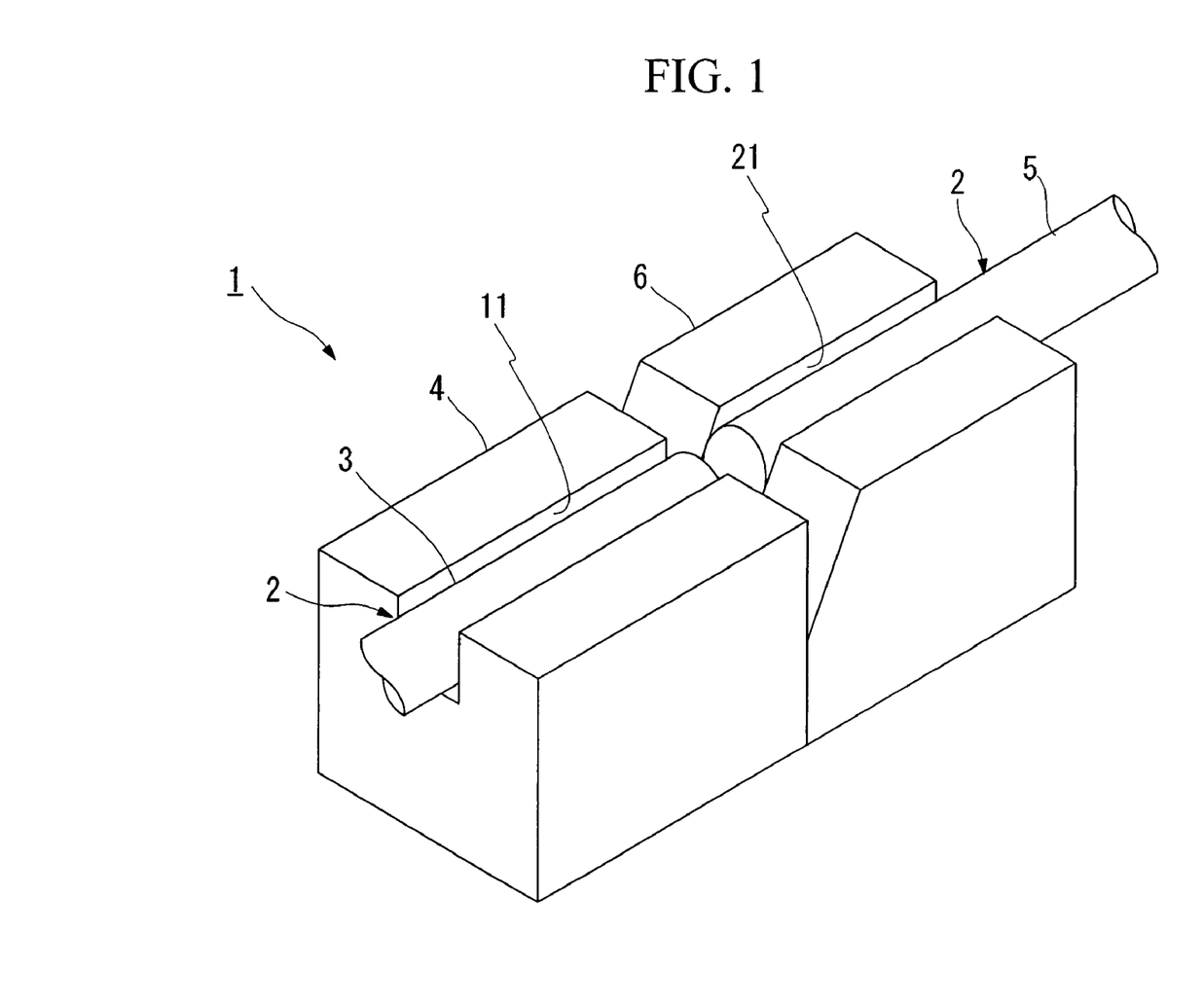
FIG. 1 is a perspective view of an optical fiber coupling structure according to an embodiment of the present invention.
Figure 3:
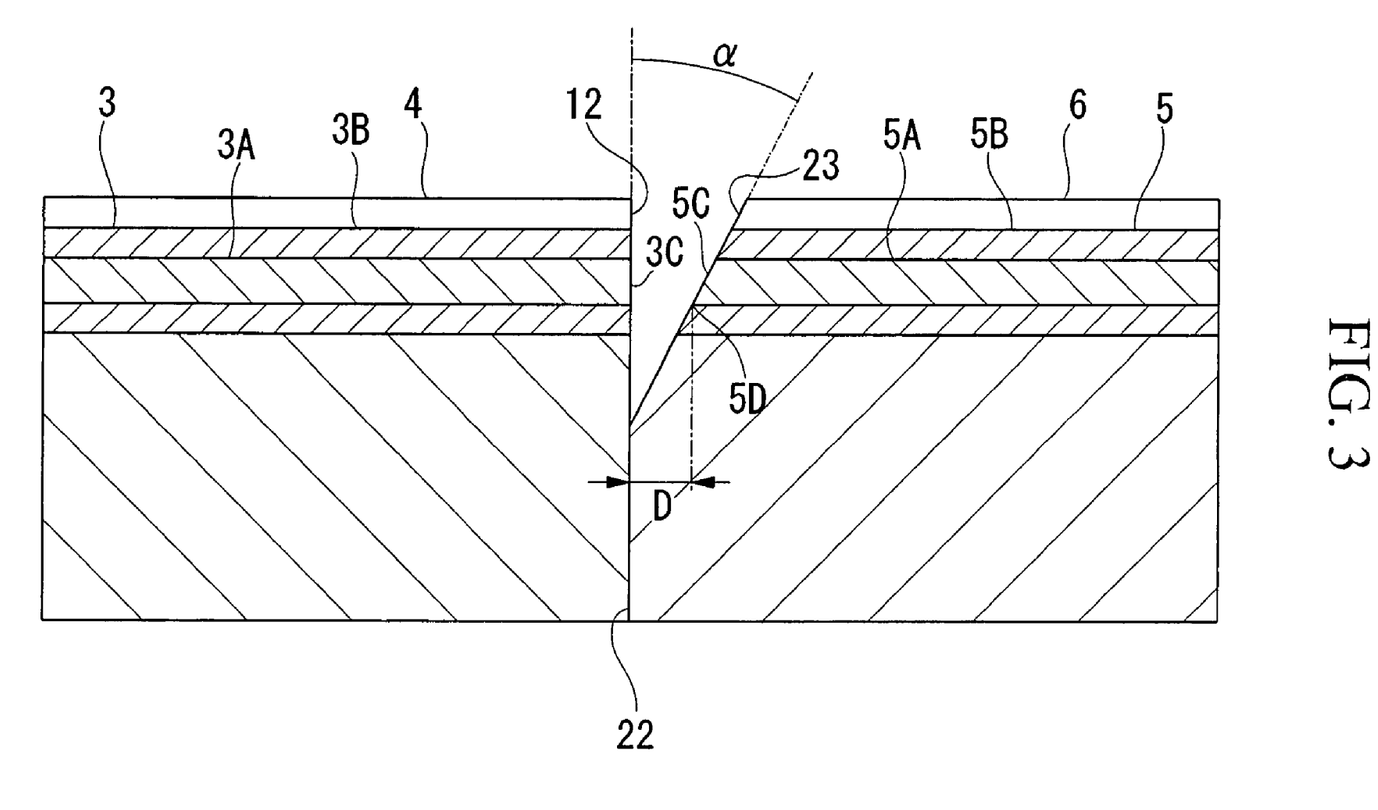
FIG. 3 is a cross-sectional view of the principal portion of the optical fiber coupling structure according to an embodiment of the present invention.

FIG. 1 is a perspective view of an optical fiber coupling structure 1 used in the optical fiber laser 101 of FIG. 6, and the coupling structure includes an emission-side base and an incidence-side base that are used to couple optical fibers. FIG. 3 is a cross-sectional view of this optical fiber coupling structure.

The optical fiber coupling structure 1 optically couples a pair of optical fibers 2 (namely, an emission-side optical fiber 3 and an incidence-side optical fiber 5) that are pro- vided a dielectric multilayer film (not shown) on an end surface. The emission-side optical fiber 3 is attached using adhesive on the emission-side base 4, and the incidence-side optical fiber 5 is attached using adhesive on the incidence-side base 6.

The optical fibers 3 and 5 that are optically coupled by the optical fiber coupling structure 1 each include an optical fiber core wire and a bare optical fiber that has been stripped of the coating of the optical fiber core wire at the end portion. As shown in FIG. 3, the bare optical fiber of the optical fiber 3 includes a core 3A in which optical signals are propagated and a cladding 3B that is made of glass and is disposed around the core 3A. Similarly, the bare optical fiber of the optical fiber 5 includes a core 5A in which optical signals are propagated and a cladding 5B that is made of glass and is disposed around the core 5A. Furthermore, dielectric multilayer films are provided on end surfaces 3C and 5C of the optical fibers 3 and 5, respectively, and the dielectric multilayer films reflect only light having a certain wavelength.

Figure 2A:
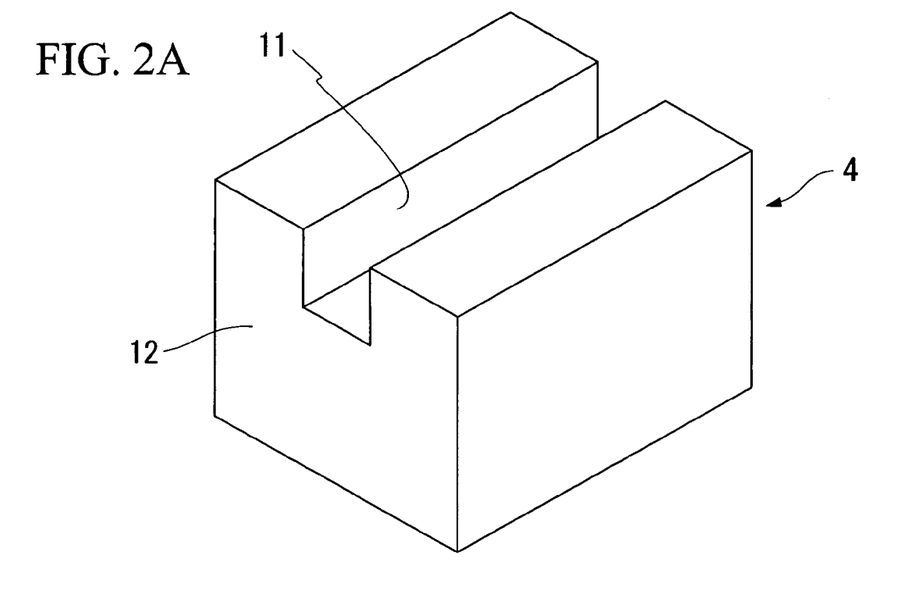
FIG. 2A is a perspective view of an emission-side base of the optical fiber coupling structure according to an embodiment of the present invention.
Figure 2B:
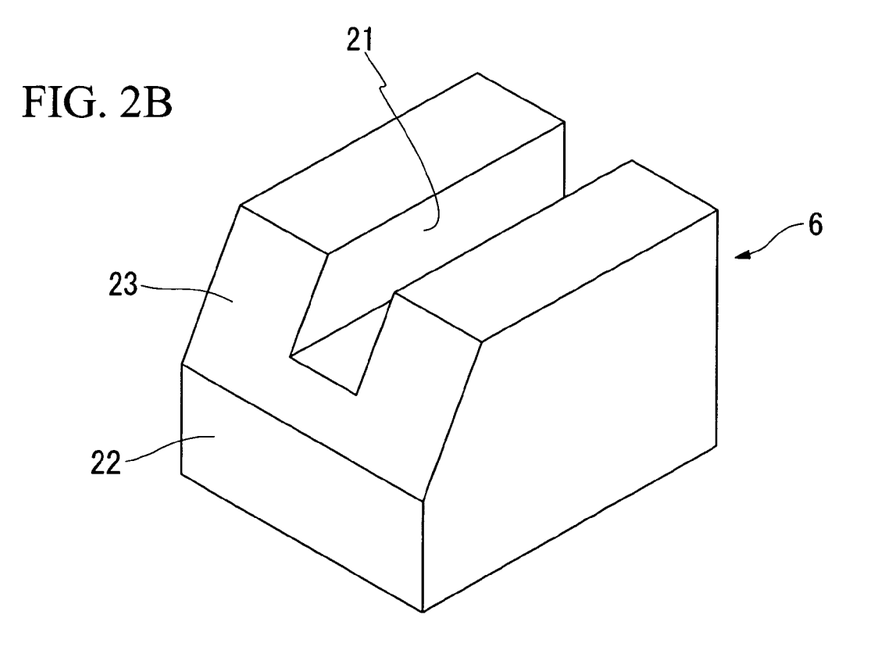
FIG. 2B is a perspective view of an incidence-side base of the optical fiber coupling structure according to an embodiment of the present invention.

FIG. 2A is a perspective view of the emission-side base, and FIG. 2B is a perspective view of the incidence-side base 4. As shown in FIGS. 2A and 3, the emission-side base 4 includes a receiving groove 11 and a coupling end surface 12. The emission-side optical fiber 3 shown in FIG. 1 is securely received within the receiving groove 11, and the end surface (end) 3C of the emission-side optical fiber 3 received in the receiving groove 11 is exposed at the coupling end surface 12. As shown in FIG. 1, since the receiving groove 11 is provided on the surface of the emission-side base 4, the emission-side optical fiber 3 can be secured in the receiving groove 11 by placing it within the receiving groove 11 and adhering it thereto using ultraviolet curing adhesive or the like in a short time. Thus, the time required for optically coupling optical fibers can be reduced significantly compared to a conventional method in which an optical fiber is inserted into a ferrule and adhered thereto using thermal curing adhesive, and the efficiency of the process can be improved greatly. Once the emission-side optical fiber 3 is adhered using adhesive, the coupling end surface 12 is polished in a vertical direction.

As shown in FIGS. 2B and 3, the incidence-side base 6 includes a receiving groove 21, an abutting surface 22, and a slope 23. The incidence-side optical fiber 5 shown in FIG. 1 is securely received within the receiving groove 21, and the end of the incidence-side optical fiber 5 received in the receiving groove 21 is exposed at the slope 23. Against the abutting surface 22 of the incidence-side base 6, the coupling end surface 12 of the emission-side base 4 is abutted. Similar to the emission-side base 4, since the receiving groove 21 is provided on the surface of the incidence-side base 6 as shown in FIG. 1, the incidence-side optical fiber 5 can be secured in the receiving groove 21 by placing it within the receiving groove 11 and adhering it thereto using an ultraviolet curing adhesive.

Once the incidence-side optical fiber 5 is received, the exposed surface of the end of the incidence-side optical fiber 5 is polished at α degrees with respect to the abutting surface 22 to form the slope 23.

It should be noted that although the receiving grooves 11 and 21 are illustrated as having a rectangular cross section in FIG. 1, the cross-section of the receiving grooves 11 and 21 is not limited to this shape provided that an optical fiber is received. The receiving grooves 11 and 21 may be a V-shaped groove, or a U-shaped groove, or a semi-circular groove, or the like.

The method for optically coupling optical fibers using the optical fiber coupling structure 1 having the structure described above. As shown in FIG. 1, after being received in the receiving groove 11, the emission-side optical fiber 3 is attached to the receiving groove 11 using ultraviolet curing adhesive. Then, the exposed surface of the emission-side optical fiber 3 is polished in a vertical direction to form the coupling end surface 12. Similar to the emission-side optical fiber 3, after being received in the receiving groove 21, the incidence-side optical fiber 5 is attached to the receiving groove 21 using adhesive. Then, the exposed surface of the incidence-side optical fiber 5 is polished to form the slope 23. The coupling end surface 12 of the emission-side base 4 and the abutting surface 22 of the incidence-side base 6 are abutted against each other. After aligning the coupling end surface 12 and the abutting surface 22 so that the loss of the optical coupling is minimized, the coupling end surface 12 and the abutting surface 22 are attached using an adhesive.

Upon optically coupling optical fibers using the method described above, the coupling loss which occurs in the optical coupling portion varies depending on various parameters. These parameters include a core radius $r_1$ of the core 3A of the emission-side optical fiber 3, a core radius $r_2$ of the core 5A of the incidence-side optical fiber 5, a numeric aperture $NA_1$ of the emission-side optical fiber 3, a numeric aperture $NA_2$ of the incidence-side optical fiber 5, an end surface spacing D that is the distance between the coupling end surface 12 of the emission-side optical fiber 3 and an end 5D of the core 5A of the incidence-side optical fiber 5, an end surface angle $\alpha$ that is an angle between the coupling end surface 12 of the emission-side optical fiber 3 and the slope 23 of the incidence-side base 6 shown in FIG. 3.

Figure 4:
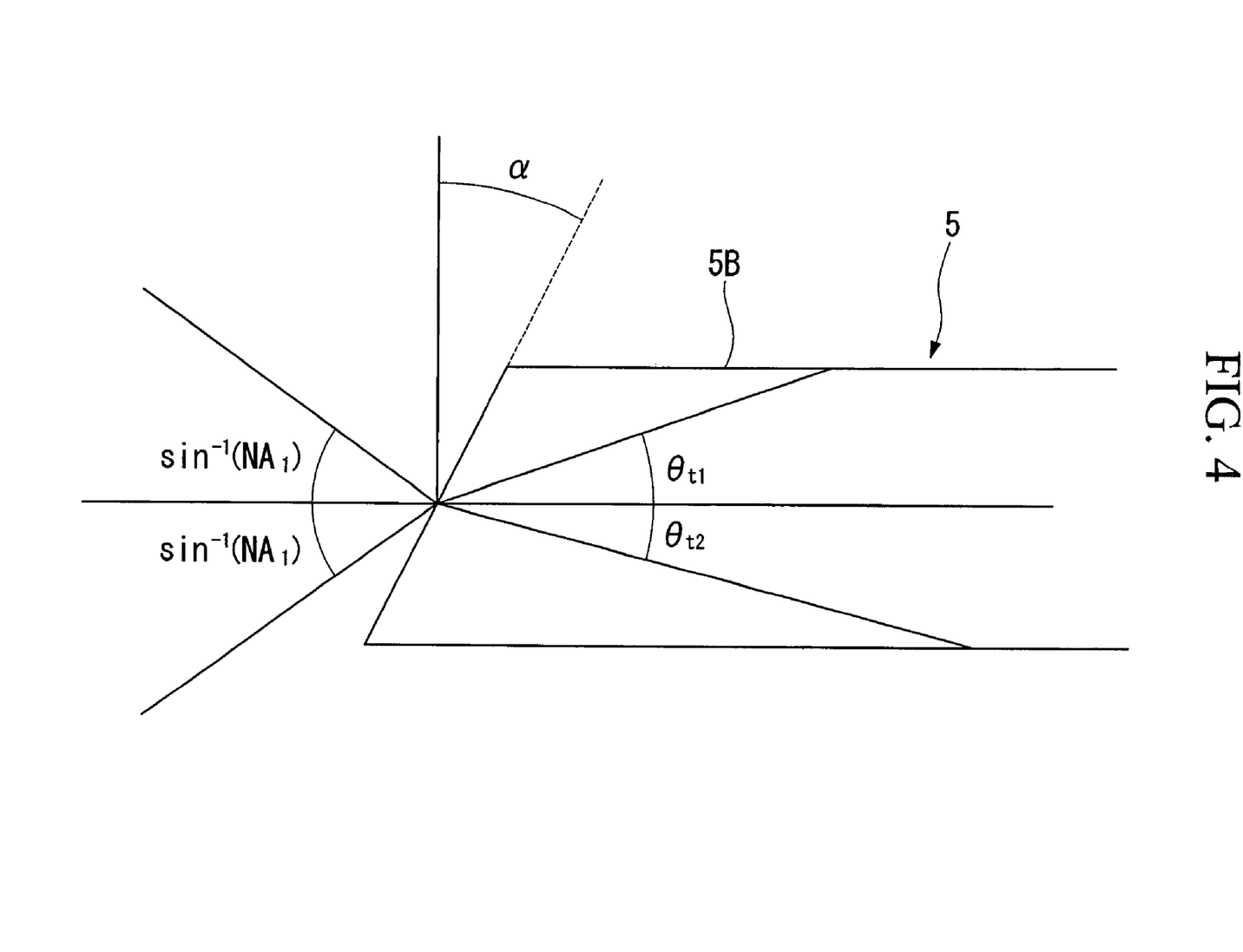
FIG. 4 is a enlarged cross-sectional view of the principal portion of the optical fiber coupling structure according to an embodiment of the present invention.

As shown in FIG. 4, light emitted from the emission-side optical fiber 3 propagates the gap between the two ends while spreading at an angle of $\sin^{-1}(NA_1)$ (radians) with respect to the optical axis. The spot radius R of the light can be expressed by the following formula (4):

$$R = r_1 + D \cdot \tan\{\sin^{-1}(NA_1)\} \quad (4)$$

If the core radius $r_2$ of the incidence-side optical fiber 5 is smaller than the spot radius R, coupling loss is increased since not all of the light is incident on the incidence-side optical fiber 5. This means that the coupling loss can be reduced by selecting the value of the end surface spacing D so that R is smaller than $r_2$ when it is assumed that the core radius $r_2$ of the incidence-side optical fiber 5 is equal to or more than the core radius $r_1$ of the emission-side optical fiber 3. In the present case, since the incidence-side base 6 has the slope 23 as shown in FIG. 3, the spot radius R should be smaller than the core radius $r_1$ of the incidence-side optical fiber 5 in the region in which the spacing between the core 5A of the incidence-side optical fiber 5 and the coupling end surface 12 of the emission-side optical fiber 3 is the greatest. Thus, the spot radius R should satisfy the following formula (1).

$$D < \frac{r_2 - r_1}{\tan\{\sin^{-1}(NA_1)\}} - 2r_2 \cdot \tan\alpha \quad (1)$$

If the above-described formula (1) is satisfied, all of the light emitted from the emission-side optical fiber 3 is incident on the incidence-side optical fiber 5 and then propagated within the incidence-side optical fiber 5. Thus, an optical coupling that exhibits excellent optical characteristics can be obtained. If the end surface spacing D is equal to or more than the right-hand side of the above-described formula (1), not all of the light emitted from the emission-side optical fiber 3 is incident on the incidence-side optical fiber 5, which results in a poor connection.

Furthermore, if the light emitted from the emission-side optical fiber 3 at an angle of $\sin^{-1}(NA_1)$ is incident on the incidence-side optical fiber 5, the light is propagated within the core 5A of the incidence-side optical fiber 5 at angles $\theta_{t1}$ and $\theta_{t2}$ as shown in FIG. 4, which is expressed by the following formulae (5) and (6):

$$\theta_{t1} = \sin^{-1}\{1/n_c \times \sin[\sin^{-1}(NA_1) + \alpha]\} - \alpha \quad (5)$$

$$\theta_{t2} = \sin^{-1}\{1/n_c \times \sin[\sin^{-1}(NA_1) - \alpha]\} + \alpha \quad (6)$$

where $n_c$ is an refractive index of the core 5A of the incidence-side optical fiber 5. A maximum propagation angle $\theta_{t\_max}$ is determined by the numeric aperture $NA_2$ of the incidence-side optical fiber 5, and is expressed by the following formula (7):

$$\theta_{t\_max} = \sin^{-1}(NA_2/n_c) \quad (7)$$

Accordingly, for the light incident on the incidence-side optical fiber 5 to propagate within the incidence-side optical fiber 5, the condition expressed by the following formula (8) should be satisfied:

$$\theta_{t\_max} > |\theta_t| \quad (8)$$

Otherwise, the light leaks rather than being contained in the core 5A, which results in loss. In other words, among the light having an angle component $\theta_t$ that reaches the end surface of the incidence-side optical fiber 5, only light having an angle component smaller than $\theta_{t\_max}$ can propagate within the fiber, where $\theta_t$ is an angle with respect to the optical axis at which light propagates within the optical fiber.

Furthermore, the coupling loss L due to the optical coupling is determined by the following formula (2):

$$L = (L_1 + L_2)/2 \quad (2)$$

where $$L_1 = \begin{cases} 0 & (\theta_{t\_max} > \theta_{t1}) \\ 1 - \theta_{t\_max}/\theta_{t1} & (\theta_{t\_max} \leq \theta_{t1}) \end{cases}$$

$$L_2 = \begin{cases} 0 & (\theta_{t\_max} > \theta_{t2}) \\ 1 - \theta_{t\_max}/\theta_{t2} & (\theta_{t\_max} \leq \theta_{t2}) \end{cases}$$

Since the coupling loss L of a typical optical connector is about 10%, the end surface angle $\alpha$ is selected so that the coupling loss L is less than 0.1.

Therefore, the end surface angle $\alpha$ should fall within the range expressed by the following formula (3):

$$\sin^{-1}(NA_1/n_c) > |\sin^{-1}\{1/n_c \times \sin(\sin^{-1}(NA_1) \pm \alpha)\} \mp \alpha| \quad (3)$$

If the end surface angle $\alpha$ is selected so that it falls within the range given by the above-described formula (3), all of the light emitted from the emission-side optical fiber 3 is incident on the incidence-side optical fiber 5 and is propagated within the fiber. Thus, an optical coupling that exhibits excellent optical characteristics can be obtained.

Figure 5:
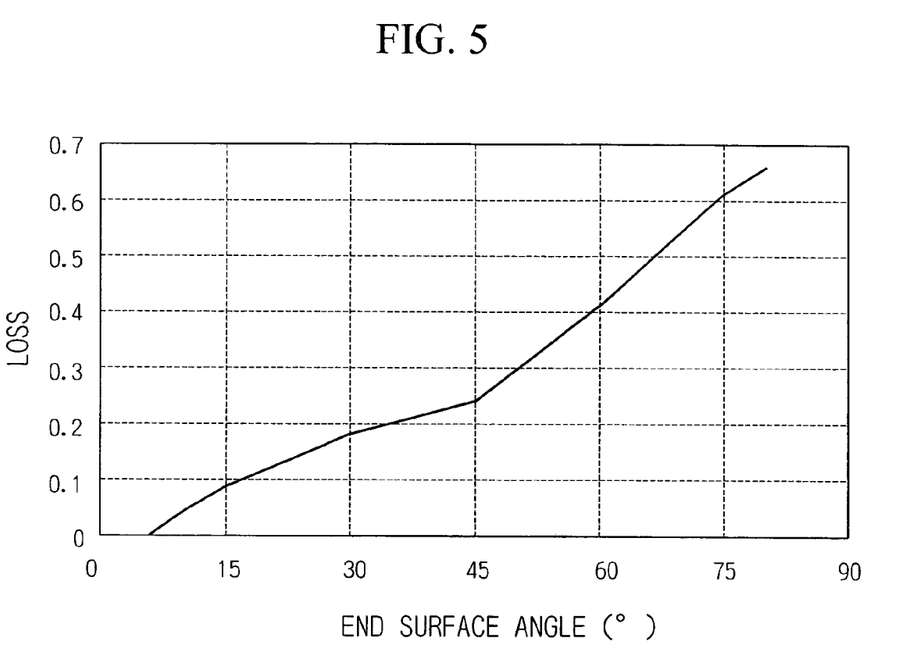
FIG. 5 is a graph showing the relationship between the end surface angle α and loss in an example.

The two optical fibers were coupled with $NA_1$ of 0.35, $NA_2$ of 0.35, $n_c$ of 1.47, and $\theta_{t\_max}$ of 0.24 (radians), and the loss was measured while varying the end surface angle $\alpha$. The results are shown in FIG. 5. As described above, an optical coupling is considered as exhibiting low coupling loss if L is less than 0.1. These results indicate that the coupling loss L was smaller than 0.1 in this optical fiber coupling structure when the end surface angle α was equal to or less than 17°. Therefore, an excellent optical coupling is obtained by providing the slope with this optical fiber coupling structure when an end surface angle α is equal to or less than 17°. In addition, no loss occurred and an excellent optical coupling was obtained when the end surface angle α was equal to or less than 6°.

According to the exemplary embodiment described above, since the spot radius R of the incidence-side optical fiber 5 is increased, an optical coupling with low loss is possible even if the horizontal misalignment is present. In addition, a clearance between the emission-side optical fiber 3 and the incidence-side optical fiber 5 is defined by abutting the coupling end surface 12 and the abutting surface 22 each other, the optical coupling can be established easily.

Furthermore, the clearance prevents the dielectric multilayer film formed on the end surface 3C of the emission-side optical fiber 3 and the dielectric multilayer film formed on the end surface 5C of the incidence-side optical fiber 5 from contacting each other, and damage to the dielectric multilayer films is prevented. Accordingly, optical fibers can be easily coupled without adversely affecting the optical characteristics.

This invention has been described herein in considerable detail in order to comply with the Patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

What is claimed is:

1. An optical fiber coupling structure for optically coupling an emission-side optical fiber and an incidence-side optical fiber, comprising:
   an emission-side base comprising:
     a coupling end surface; and
   an incidence-side base comprising
     an abutting surface; and
     a slope,
   wherein the emission-side optical fiber is secured to the emission-side base, and an end of the emission-side optical fiber is exposed at the coupling end surface,
   wherein the incidence-side optical fiber is secured to the incidence-side base, an end of the incidence-side optical fiber is exposed at the slope of said incidence-side base, and said exposed end of said incidence-side optical fiber has a slope which corresponds to the slope of said incidence-side base,
   wherein the coupling end surface of the emission-side base is abutted against the abutting surface of the incidence-side base, the emission-side optical fiber exposed at the coupling end surface of the emission-side base and the incidence-side optical fiber exposed at the slope of the incidence-side base are spaced apart with a clearance, and the emission-side optical fiber and the incidence-side optical fiber are optically coupled; and
   wherein a core radius $r_2$ of the incidence-side optical fiber is larger than a core radius $r_1$ of the emission-side optical fiber.

2. An optical fiber coupling structure for optically coupling an emission-side optical fiber and an incidence-side optical fiber, comprising:
   an emission-side base comprising:
     a coupling end surface; and
   an incidence-side base comprising:
     an abutting surface; and
     a slope,
   wherein the emission-side optical fiber is secured to the emission-side base, and an end of the emission-side optical fiber is exposed at the coupling end surface,
   wherein the incidence-side optical fiber is secured to the incidence-side base, an end of the incidence-side optical fiber is exposed at the slope of said incidence-side base, and said exposed end of said incidence-side optical fiber has a slope which corresponds to the slope of said incidence-side base.
   wherein the coupling end surface of the emission-side base is abutted against the abutting surface of the incidence-side base, the emission-side optical fiber exposed at the coupling end surface of the emission-side base and the incidence-side optical fiber exposed at the slope of the incidence-side base are spaced apart with a clearance, and the emission-side optical fiber and the incidence-side optical fiber are optically coupled, and
   wherein an end surface spacing D that is a distance between the end surface of the emission-side optical fiber and an end of a slope provided in a core of the incidence-side optical fiber is expressed by the following formula (1):

$$D < \frac{r_2 - r_1}{\tan\{\sin^{-1}(NA_1)\}} - 2r_2 \cdot \tan\alpha \qquad (1)$$

wherein α is an angle between the coupling end surface of the emission-side base and the slope of the incidence-side base, $r_1$ a core radius of the emission-side optical fiber, $r_2$ is a core radius of the incidence-side optical fiber and $NA_1$ is a numeric aperture of the emission-side optical fiber.

3. The optical fiber coupling structure according to claim 2, wherein a coupling loss L defined in the following formula (2) is less than 0.1:

$$L = (L_1 + L_2)/2 \qquad (2)$$

where $$L_1 = \begin{cases} 0 & (\theta_{t\_max} > \theta_{t1}) \\ 1 - \theta_{t\_max}/\theta_{t1} & (\theta_{t\_max} \le \theta_{t1}) \end{cases}$$

$$L_2 = \begin{cases} 0 & (\theta_{t\_max} > \theta_{t2}) \\ 1 - \theta_{t\_max}/\theta_{t2} & (\theta_{t\_max} \le \theta_{t2}) \end{cases}$$

where $\theta_{t\_max}$ is a maximum propagation angle, and $$\theta_{t\_max} = \sin^{-1}(NA_2/n_c)$$

$$\theta_{t1} = \sin^{-1}\{1/n_c \times \sin[\sin^{-1}(NA_1) + \alpha]\} - \alpha$$

$$\theta_{t2} = \sin^{-1}\{1/n_c \times \sin[\sin^{-1}(NA_1) - \alpha]\} + \alpha$$

where $n_c$ is a refractive index of said core of said incidence-side optical fiber, $NA_1$ is a numeric aperture of the emission-side optical fiber, and $NA_2$ is a numeric aperture of the incidence-side optical fiber.

4. The optical fiber coupling structure according to claim 2, wherein the end surface angle α satisfies a condition expressed by the following formula (3):

$$\sin^{-1}(NA_1/n_c) > |\sin^{-1}\{1/n_c \times \sin(\sin^{-1}(NA_1) \pm \alpha)\} \mp \alpha| \qquad (3)$$

where $n_c$ is a refractive index of said core of said incidence-side optical fiber.

5. A method for optically coupling an emission-side optical fiber and an incidence-side optical fiber, comprising the steps of:
   providing an emission-side base comprising a first groove and a coupling end surface;
   providing an incidence-side base comprising a second groove, an abutting surface, and a slope;
   securing the emission-side optical fiber to the first groove of the emission-side base to expose an end of the emission-side optical fiber at the coupling end surface of the emission-side optical fiber;
   securing the incidence-side optical fiber to the second groove of the incidence-side base to expose an end of the incidence-side optical fiber at the slope of the incidence-side optical fiber;
   optically coupling the emission-side optical fiber and the incidence-side optical fiber by abutting the coupling end surface of the emission-side base against the abutting surface of the incidence-side base so that the emission-side optical fiber exposed at the coupling end surface of the emission-side base and the incidence-side optical fiber exposed at the slope of the incidence-side base are spaced apart with a clearance; and
   providing the incidence-side optical fiber with a core radius $r_2$ which is larger than a core radius $r_1$ of the emission-side optical fiber.

6. A method for optically coupling an emission-side optical fiber and an incidence-side optical fiber, comprising the steps of:
   providing an emission-side base comprising a first groove and a coupling end surface;
   providing an incidence-side base comprising a second groove, an abutting surface, and a slope;
   securing the emission-side optical fiber to the first groove of the emission-side base to expose an end of the emission-side optical fiber at the coupling end surface of the emission-side optical fiber;
   securing the incidence-side optical fiber to the second groove of the incidence-side base to expose an end of the incidence-side optical fiber at the slope of the incidence-side optical fiber; and
   optically coupling the emission-side optical fiber and the incidence-side optical fiber by abutting the coupling end surface of the emission-side base against the abutting surface of the incidence-side base so that the emission-side optical fiber exposed at the coupling end surface of the emission-side base and the incidence-side optical fiber exposed at the slope of the incidence-side base are spaced apart with a clearance;
   wherein the end surface of the emission-side optical fiber and an end of a slope provided in a core of the incidence-side optical fiber are spaced apart to a distance D as expressed by the following formula (1):

$$D < \frac{r_2 - r_1}{\tan\{\sin^{-1}(NA_1)\}} - 2r_2 \cdot \tan\alpha \qquad (1)$$

wherein $\alpha$ is an angle between the coupling end surface of the emission-side base and the slope of the incidence-side base, $r_1$ a core radius of the emission-side optical fiber, $r_2$ is a core radius of the incidence-side optical fiber and $NA_1$ is a numeric aperture of the emission-side optical fiber.

7. The method of claim 6, wherein a coupling loss L defined in the following formula (2) is less than 0.1:

$$L = (L_1 + L_2)/2 \qquad (2)$$

where $$L_1 = \begin{cases} 0 & (\theta_{t\_max} > \theta_{t1}) \\ 1 - \theta_{t\_max}/\theta_{t1} & (\theta_{t\_max} \leq \theta_{t1}) \end{cases}$$

$$L_2 = \begin{cases} 0 & (\theta_{t\_max} > \theta_{t2}) \\ 1 - \theta_{t\_max}/\theta_{t2} & (\theta_{t\_max} \leq \theta_{t2}) \end{cases}$$

where $\theta_{t\_max}$ is a maximum propagation angle, and $$\theta_{t\_max} = \sin^{-1}(NA_2/n_c)$$

$$\theta_{t1} = \sin^{-1}\{1/n_c \times \sin[\sin^{-1}(NA_1) + \alpha]\} - \alpha$$

$$\theta_{t2} = \sin^{-1}\{1/n_c \times \sin[\sin^{-1}(NA_1) - \alpha]\} + \alpha$$

where $n_c$ is a refractive index of said core of said incidence-side optical fiber, $NA_1$ is a numeric aperture of the emission-side optical fiber, and $NA_2$ is a numeric aperture of the incidence-side optical fiber.

8. The method of claim 6, wherein the end surface angle $\alpha$ is adjusted to satisfy a condition expressed by the following formula (3):

$$\sin^{-1}(NA_1/n_c) > |\sin^{-1}\{1/n_c \times \sin(\sin^{-1}(NA_1) \pm \alpha)\} \mp \alpha| \qquad (3)$$

where $n_c$ is a refractive index of said core of said incidence-side optical fiber.

9. The method of claim 5, wherein once the emission-side optical fiber is secured to the emission side base, the coupling end surface of the emission-side base is polished in a vertical direction.

10. The method of claim 5, wherein once the incidence-side optical fiber is secured to the incidence-side base, the exposed surface of the incidence-side optical fiber is polished at an angle with respect to the abutting surface of the incidence-side base.

11. The optical fiber coupling structure of claim 1 wherein: said emission-side base further comprises a first groove and said incidence-side base further comprises a second groove; and wherein
   and said emission-side optical fiber is secured to said emission-side base at said first groove and said incidence-side optical fiber is secured to said incidence-side base at said second groove.

12. An optical fiber coupling structure comprising:
   an emission-side optical fiber including an exposed end surface;
   an incidence-side optical fiber including a sloped exposed end surface;
   an emission-side base comprising a coupling end surface; and
   an incidence-side base comprising an abutting surface; wherein:
   said emission-side optical fiber is secured to said emission side base and said incidence-side optical fiber is secured to said incidence-side base;
   said coupling end surface is abutted against said abutting end surface so that said sloped exposed end surface of said incidence-side optical fiber and exposed end surface of said emission-side optical fiber are optically coupled;
   said emission-side optical fiber further comprises a core and a cladding layer surrounding said core;

said incidence-side optical fiber further comprises a core and a cladding layer surrounding said core; and a radius of said core of said incidence-side optical fiber is larger than a radius of said core of said emission-side optical fiber.

13. The optical fiber coupling structure of claim 12, wherein said exposed end of said emission-side optical fiber and said sloped exposed end of said incidence-side optical fiber are spaced apart.

14. The optical fiber coupling structure of claim 12 wherein:

said emission-side base further comprises a first groove and said incidence-side base further comprises a second groove; and wherein and said emission-side optical fiber is secured to said emission-side base at said first groove and said incidence-side optical fiber is secured to said incidence-side base at said second groove.

15. The optical fiber coupling structure of claim 12, wherein said incidence-side base further comprises a sloped surface, and said exposed end of said incidence-side optical fiber is exposed at said sloped surface of said incidence-side base.

16. An optical fiber coupling structure comprising:

an emission-side optical fiber including an exposed end surface;

an incidence-side optical fiber including a sloped exposed end surface;

an emission-side base comprising a coupling end surface; and an incidence-side base comprising an abutting surface; wherein:

said emission-side optical fiber is secured to said emission side base and said incidence-side optical fiber is secured to said incidence-side base; and said coupling end surface is abutted against said abutting end surface so that said sloped exposed end surface of said incidence-side optical fiber and said exposed end surface of said emission-side optical fiber are optically coupled;

wherein an end surface spacing D that is a distance between said exposed end of the emission-side optical fiber and an end of a core of said incidence-side optical fiber at said exposed sloped end of said incidence-side optical fiber is expressed by the following formula (1):

$$D < \frac{r_2 - r_1}{\tan\{\sin^{-1}(NA_1)\}} - 2r_2 \cdot \tan\alpha \quad (1)$$

wherein $\alpha$ is an angle between the coupling end surface of the emission-side base and the slope of the exposed end of the incidence-side optical fiber, $r_1$ a core radius of the emission-side optical fiber, $r_2$ is a core radius of the incidence-side optical fiber and $NA_1$ is a numeric aperture of the emission-side optical fiber.

17. The optical fiber coupling structure according to claim 16, wherein a coupling loss L defined in the following formula (2) is less than 0.1:

$$L = (L_1 + L_2)/2 \quad (2)$$

where $$L_1 = \begin{cases} 0 & (\theta_{t\_max} > \theta_{t1}) \\ 1 - \theta_{t\_max}/\theta_{t1} & (\theta_{t\_max} \leq \theta_{t1}) \end{cases}$$

$$L_2 = \begin{cases} 0 & (\theta_{t\_max} > \theta_{t2}) \\ 1 - \theta_{t\_max}/\theta_{t2} & (\theta_{t\_max} \leq \theta_{t2}) \end{cases}$$

where $\theta_{t\_max}$ is a maximum propagation angle, and $$\theta_{t\_max} = \sin^{-1}(NA_2/n_c)$$

$$\theta_{t1} = \sin^{-1}\{1/n_c \times \sin[\sin^{-1}(NA_1) + \alpha]\} - \alpha$$

$$\theta_{t2} = \sin^{-1}\{1/n_c \times \sin[\sin^{-1}(NA_1) - \alpha]\} + \alpha$$

where $n_1$ is a refractive index of a core of said incidence-side optical fiber, $NA_1$ is a numeric aperture of the emission-side optical fiber, and $NA_2$ is a numeric aperture of the incidence-side optical fiber.

* * * * *